United States Patent
Favresse et al.

(10) Patent No.: US 11,377,523 B2
(45) Date of Patent: Jul. 5, 2022

(54) PROCESS FOR PRODUCING NON-CYCLIC ALKOXY-FUNCTIONAL POLYSILOXANES

(71) Applicant: Evonik Operations GmbH, Essen (DE)

(72) Inventors: Philippe Favresse, Ratingen (DE); Michael Fiedel, Essen (DE); Ute Hesse, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/929,841

(22) Filed: May 26, 2020

(65) Prior Publication Data
US 2020/0377668 A1 Dec. 3, 2020

(30) Foreign Application Priority Data
May 28, 2019 (EP) .................................... 19176885

(51) Int. Cl.
C08G 77/08 (2006.01)
C08G 77/00 (2006.01)
C08G 77/06 (2006.01)

(52) U.S. Cl.
CPC ............. C08G 77/70 (2013.01); C08G 77/06 (2013.01); C08G 77/08 (2013.01)

(58) Field of Classification Search
CPC ................................ C08G 77/08; C08G 77/06
USPC ..................................................... 528/14, 23
See application file for complete search history.

(56) References Cited

U.S. PATENT DOCUMENTS

| | | | | |
|---|---|---|---|---|
| 4,508,887 A * | 4/1985 | Kohl | ....... | C08G 77/08 524/860 |
| 4,525,470 A * | 6/1985 | Kohl | ....... | C08G 77/08 502/167 |
| 4,923,755 A * | 5/1990 | Witucki | ....... | C09D 183/04 428/447 |
| 4,929,691 A * | 5/1990 | Fillmore | ....... | C08G 77/08 525/477 |
| 5,241,032 A * | 8/1993 | Kobayashi | ....... | C08G 77/12 528/12 |
| 7,074,874 B2 * | 7/2006 | Kobayashi | ....... | C08G 77/04 528/34 |
| 7,442,724 B2 | 10/2008 | Esselborn et al. | | |
| 7,838,603 B2 | 11/2010 | Schwab et al. | | |
| 8,729,207 B2 | 5/2014 | Hartung et al. | | |
| 9,115,335 B2 | 8/2015 | Trosin et al. | | |
| 9,346,919 B2 | 5/2016 | Jazkewitsch et al. | | |
| 9,353,225 B2 | 5/2016 | Knott et al. | | |
| 9,481,695 B2 | 11/2016 | Knott et al. | | |
| 9,738,797 B2 | 8/2017 | Nilewski et al. | | |
| 9,790,327 B2 | 10/2017 | Klotzbach et al. | | |
| 9,896,541 B2 | 2/2018 | Fiedel et al. | | |
| 10,010,838 B2 | 7/2018 | Favresse et al. | | |
| 10,106,644 B2 | 10/2018 | Fiedel et al. | | |
| 10,106,649 B2 | 10/2018 | Fiedel et al. | | |
| 10,287,454 B2 | 5/2019 | Klotzbach et al. | | |
| 10,399,051 B2 | 9/2019 | Favresse et al. | | |
| 10,414,872 B2 | 9/2019 | Knott et al. | | |
| 10,457,769 B2 | 10/2019 | Günther et al. | | |
| 10,577,512 B2 | 3/2020 | Aitha et al. | | |
| 10,703,851 B2 | 7/2020 | Günther et al. | | |
| 2003/0109659 A1* | 6/2003 | Bordone | ................ | C08G 77/08 528/10 |
| 2004/0014925 A1 | 1/2004 | Hell et al. | | |
| 2004/0158018 A1* | 8/2004 | Kobayahi | .............. | C08G 77/38 528/10 |
| 2005/0085563 A1 | 4/2005 | Esselborn et al. | | |
| 2008/0221276 A1 | 9/2008 | Schwab et al. | | |
| 2011/0144269 A1 | 6/2011 | Kuppert et al. | | |

(Continued)

FOREIGN PATENT DOCUMENTS

| | | |
|---|---|---|
| DE | 24 13 987 | 9/1975 |
| EP | 1 634 940 | 3/2006 |

(Continued)

OTHER PUBLICATIONS

U.S. Appl. No. 10/619,395, filed Jul. 15, 2003, 2004/0014925, Hell et al.
U.S. Pat. No. 7,442,724, Oct. 28, 2008, 2005/0085563, Esselborn et al.
U.S. Pat. No. 7,838,603, Nov. 23, 2010, 2008/0221276, Schwab et al.
U.S. Appl. No. 13/058,372, filed Feb. 10, 2011, 2011/0144269, Kuppert et al.
U.S. Appl. No. 13/642,323, filed Oct. 19, 2012, 2013/0035452, Kuppert et al.
U.S. Pat. No. 8,729,207, May 20, 2014, 2012/0010302, Hartung et al.
U.S. Appl. No. 13/205,834, filed Aug. 9, 2011, 2012/0037036, Veit et al.
U.S. Appl. No. 13/771,921, filed Feb. 20, 2013, 2013/0213267, Fiedel et al.

(Continued)

Primary Examiner — Margaret G Moore
(74) Attorney, Agent, or Firm — Grüneberg and Myers PLLC

(57) ABSTRACT

A reaction product containing a non-cyclic alkoxy-functional polysiloxane is produced by heating a reaction system, which contains a cyclic polyorganosiloxane of the formula $[(R^1_2SiO)_{2/2}]_n$, where the subscript n is an integer of at least 4 and each $R^1$ is an alkyl group or aryl group; a silane of the formula $R^2_{(4-m)}Si(OR^3)_m$, where the subscript m is an integer from 1 to 4, each $R^2$ independently is an alkyl group or aryl group, a hydrocarbyl group or a halogenated hydrocarbyl group and each $R^3$ independently is an alkyl group; and a catalyst system comprising a metal trifluoromethanesulfonate of the formula $[M]^+[CF_3SO_3]^-$, where M is a metal atom selected from sodium (Na) and potassium (K), and a Brønsted acid, wherein Brønsted acids having a pKa≤3.0, preferably having a pKa≤2.0, particularly preferably having a pKa≤-0.0 are used.

17 Claims, 1 Drawing Sheet

(56) References Cited

U.S. PATENT DOCUMENTS

| | | |
|---|---|---|
| 2012/0010302 A1 | 1/2012 | Hartung et al. |
| 2012/0037036 A1 | 2/2012 | Veit et al. |
| 2013/0035452 A1 | 2/2013 | Kuppert et al. |
| 2013/0213267 A1 | 8/2013 | Fiedel et al. |
| 2013/0217930 A1 | 8/2013 | Haensel et al. |
| 2013/0281552 A1 | 10/2013 | Nilewski et al. |
| 2014/0274863 A1 | 9/2014 | Trosin et al. |
| 2014/0303065 A1 | 10/2014 | Jazkewitsch et al. |
| 2015/0023900 A1 | 1/2015 | Knott et al. |
| 2015/0057412 A1 | 2/2015 | Knott et al. |
| 2016/0160081 A1 | 6/2016 | Klotzbach et al. |
| 2016/0208050 A1 | 7/2016 | Klotzbach et al. |
| 2017/0081464 A1 | 3/2017 | Fiedel et al. |
| 2017/0081469 A1 | 3/2017 | Fiedel et al. |
| 2017/0088667 A1 | 3/2017 | Fiedel et al. |
| 2017/0152343 A1 | 6/2017 | Günther et al. |
| 2017/0174817 A1 | 6/2017 | Günther et al. |
| 2017/0274335 A1 | 9/2017 | Favresse et al. |
| 2018/0028994 A1 | 2/2018 | Favresse et al. |
| 2018/0094146 A1 | 4/2018 | Aitha et al. |
| 2018/0194889 A1 | 7/2018 | Günther et al. |
| 2019/0031880 A1 | 1/2019 | Cavaleiro et al. |
| 2019/0040205 A1 | 2/2019 | Knott et al. |
| 2019/0092904 A1 | 3/2019 | Fiedel et al. |
| 2019/0112502 A1 | 4/2019 | Sloot et al. |
| 2019/0194488 A1 | 6/2019 | Favresse et al. |
| 2019/0241741 A1 | 8/2019 | Seyfried et al. |
| 2019/0292404 A1 | 9/2019 | Fiedel et al. |
| 2020/0216474 A1 | 7/2020 | Fiedel et al. |

FOREIGN PATENT DOCUMENTS

| | | |
|---|---|---|
| EP | 3 022 248 | 5/2016 |
| EP | 3 438 158 | 2/2019 |
| WO | 2008/074564 | 6/2008 |
| WO | 2010/046181 | 4/2010 |
| WO | 2015/009398 | 1/2015 |
| WO | 2016/020137 | 2/2016 |
| WO | 2016/020140 | 2/2016 |
| WO | 2016/020200 | 2/2016 |
| WO | 2016/020201 | 2/2016 |
| WO | 2018/134291 | 7/2018 |
| WO | 2019/076552 | 4/2019 |
| WO | 2020/114762 | 6/2020 |

OTHER PUBLICATIONS

U.S. Appl. No. 13/771,973, filed Feb. 20, 2013, 2013/0217930, Haensel et al.
U.S. Pat. No. 9,738,797, Aug. 22, 2017, 2013/0281552, Nilewski et al.
U.S. Pat. No. 9,115,335, Aug. 25, 2015, 2014/0274863, Trosin et al.
U.S. Pat. No. 9,346,919, May 24, 2016, 2014/0303065, Jazkewitsch et al.
U.S. Pat. No. 9,481,695, Nov. 1, 2016, 2015/0023900, Knott et al.
U.S. Pat. No. 10,287,454, May 14, 2019, 2016/0160081, Klotzbach et al.
U.S. Pat. No. 9,353,225, May 31, 2016, 2015/0057412, Knott et al.
U.S. Pat. No. 9,790,327, Oct. 17, 2017, 2016/0208050, Klotzbach et al.
U.S. Pat. No. 10,010,838, Jul. 3, 2018, 2018/0028994, Favresse et al.
U.S. Pat. No. 9,896,541, Feb. 20, 2018, 2017/0088667, Fiedel et al.
U.S. Pat. No. 10/106,649, Oct. 23, 2018, 2017/0081469, Fiedel et al.
U.S. Pat. No. 10,106,644, Oct. 23, 2016, 2017/0081464, Fiedel et al.
U.S. Pat. No. 10,703,851, Jul. 7, 2020, 2017/0174817, Günter et al.
U.S. Pat. No. 10,457,769, Oct. 29, 2019, 2017/0152343, Günther et al.
U.S. Appl. No. 15/323,154, filed Dec. 30, 2016, 2018/0194889, Günther et al.
U.S. Appl. No. 15/743,232, filed Jan. 9, 2018, 2019/0292404, Fiedel et al.
U.S. Pat. No. 10,399,051, Sep. 3, 2019, 2017/0274335, Favresse et al.
U.S. Pat. No. 10,577,512, Mar. 3, 2020, 2018/0094146, Aitha et al.
U.S. Pat. No. 10,414,872, Sep. 17, 2019, 2019/0040205, Knott et al.
U.S. Appl. No. 16/044,960, filed Jul. 25, 2018, 2019/0031880, Cavaleiro et al.
U.S. Appl. No. 16/142,408, filed Sep. 26, 2018, 219/0112502, Sloot et al.
U.S. Appl. No. 16/143,543, filed Sep. 27, 2018, 2019/0092904, Fiedel et al.
U.S. Appl. No. 16/231,666, filed Dec. 24, 2018, 2019/0194488, Favresse et al.
U.S. Appl. No. 16/268,606, filed Feb. 6, 2019, 2019/0241741, Seyfried et al.
European Search Report dated Nov. 15, 2019 in European Application No. 19176885.2.

* cited by examiner

PROCESS FOR PRODUCING NON-CYCLIC ALKOXY-FUNCTIONAL POLYSILOXANES

CROSS-REFERENCE TO RELATED APPLICATION

The present application claims the benefit to European application EP 19176885.2, filed on May 28, 2019, the content of which is hereby incorporated by reference in its entirety.

BACKGROUND OF THE INVENTION

Field of the Invention

The invention relates to a process for producing a reaction product containing a non-cyclic alkoxy-functional polysiloxane, and additionally the use thereof for the production of SiOC-based silicon compounds, in particular for the production of SiOC-based polyethersiloxanes.

Discussion of the Background

SiOC-based polyethersiloxanes are known constituents of defoamers exhibiting particular efficacy and stability with respect to the defoaming of aqueous and non-aqueous media. This includes foam inhibition, defoaming, very good long-term stability and also outstanding compatibility in aqueous and non-aqueous media. All of these properties are of high importance for modern paint applications.

The term "defoamer" in the present case encompasses both products and formulations that prevent foam and also those that destroy foam and enable deaeration. In practice, the transitions between these products are blurred, so that here the common collective term defoamer is used.

In many industrial processes, in particular when work is being carried out in aqueous media, it is necessary to suppress or to completely prevent the undesired formation of foam during the production or processing operations, since foam or heads of froth which accumulate during stirring and dispersing operations or accumulate in the containers during the filling operation can lengthen the production times or else reduce the effective volume of the plant or even prevent correct operation thereof (overflowing, lack of colour transfer).

This can be achieved by adding defoamers which even at very low application concentrations of from approximately 0.001% by weight are capable of avoiding or destroying undesired foams and which at the same time do not cause any surface detects after application of the systems. In practice, the latter aspect must be taken into account at least just as much as good defoaming.

Surface defects are to be understood to be features that are undesirable to the user such as for example pinholes, craters, loss of gloss, orange peel effect, wrinkling and loss of adhesion in the coating system. However, an appropriate long-term stability of the formulations is also very important to the user since products such as paints are often not used up immediately but instead sometimes only after a relatively long storage. In the case of storage under extreme climatic conditions (heat and solar irradiation), the efficacy of a defoamer formulation can occasionally collapse after only a short time.

According to the current state of the art, a plurality of process variants are used for the production of the economically important class of the SiOC-based polyethersiloxanes, also referred to as silicone poly ethers or siloxane-polyether copolymers.

It is known to those skilled in the art that these SiOC-linked polyethersiloxanes are a product class which does not have a tendency to become a resin. Even if SiOC-linked polyethersiloxanes contain reactive groups such as hydroxy groups, they are not used for the targeted crosslinking. In contrast to silicone resins, they are not film-forming.

SiOC linkages are classically formed by the reaction of a siloxane having a leaving group (e.g. halogen) bonded to the silicon atom and an alcohol or polyetherol. The latter is typically obtained beforehand by alkoxylation of monohydroxy-functional starter compounds such as for example butanol with alkylene oxides. Chlorosiloxanes in particular are widely used as starting compounds for this reaction type. However, chlorosiloxanes are difficult to handle since they are extremely reactive. The use thereof is additionally associated with the disadvantage that hydrogen chloride formed in the course of the reaction restricts handling to corrosion-resistant installations and leads to environmental problems. Moreover, organic chlorine compounds which are undesirable for toxicological reasons may be formed in the presence of chlorosiloxanes and alcohols/polyetherols. It is also not easy to achieve a quantitative conversion in the case of the reaction of a chlorosiloxane with an alcohol or polyetherol, with the result that the OH-functional component often needs to be used in a stoichiometric excess based on the SiCl functions of the siloxane component. In practice, the use of a polyether excess means that the silicone polyethers thus produced unavoidably contain relatively large amounts of unreacted excess polyethers which lower the concentration of the surface-active silicone polyethers and impair the performance properties of the target products. It is often necessary in the chlorosiloxane route to employ bases as HCl scavengers to achieve good conversions. The use of these bases results in the formation of large quantities of salt, the removal of which on an industrial scale causes problems.

Cyclic siloxanes such as hexamethylcyclotrisiloxane, octamethylcyclotetrasiloxane and decamethylcyclopentasiloxane can be polymerized to give linear, long-chain reactive siloxanes by means of catalysis with Lewis or Brønsted acids, as is illustrated for example in W. Noll, Chemie and Technologie der Silicone [Chemistry and Technology of the Silicones], Verlag Chemie GmbH, Weinheim, 1968.

It is furthermore known to use, for the production of crosslinkable polyorganopolysiloxanes, a reactive product such as for example a methoxy-terminated polydiorganosiloxane which is produced from hexamethylcyclotrisiloxane (D3) and 1,4,6-trimethyl-2,4,6-trivinylcyclotrisiloxane (V3) with tetramethoxysilane (TMOS) in the presence of trifluoromethanesulfonic acid. ("Cationic Telomerization of Hexamethylcyclotrisiloxane (03) with Silanes Containing Alkoxy, Aryloxy and Acyloxy functions bound to Silicon", European Polymer Journal, Vol, 17, No. 4, 1981, pages 413-419).

EP 3 022 248 B1 discloses a process for producing a non-cyclic hydrocarbonoxy-functional polyorganosiloxane by heating a mixture composed of cyclic polyomanosiloxanes, a silane and a metal triflate, where the metal atom is selected from aluminium (Al), bismuth (Bi), iron (Fe), gallium (Ga), indium (In), scandium (Sc), samarium (Sm) and ytterbium (Yb).

In the scope of comprehensive investigations, the inventors were able to determine that a specific catalyst system is important for the catalysis. It is accordingly an object of the invention to provide a process with which non-cyclic alkoxy-functional polysiloxanes can be produced without using catalysts having a corrosive action with respect to metals or catalysts containing heavy metals.

SUMMARY OF THE INVENTION

The present inventions includes the following embodiments:

1. Process for producing a reaction product containing a non-cyclic alkoxy-functional polysiloxane by means of heating a reaction system comprising:
    (A) a cyclic polyorganosiloxane of the formula $[(R^1_2SiO)_{2/2}]_n$, where the subscript n is an integer of at least 4 and each $R^1$ is an alkyl group or aryl group;
    (B) a silane of the formula $R^2_{(4-m)}Si(OR^3)_m$, where the subscript m is an integer from 1 to 4, each $R^2$ independently is an alkyl group or aryl group, a hydrocarbyl group or a halogenated hydrocarbyl group and each $R^3$ independently is an alkyl group; and
    (C) a catalyst system comprising a metal trifluoromethanesulfonate of the formula $[M]^+[CF_3SO_3]^-$, where M is a metal atom selected from sodium (Na) and potassium (K), and a Brønsted acid,
        wherein Brønsted acids having a pKa≤3.0, preferably having a pKa≤2.0, particularly preferably having a pKa≤−0.0 are used.

2. Process according to embodiment 1, characterized in that the molar ratio of Brønsted acid used to metal trifluoromethanesulfonate is in the range from 1:10 to 10:1, preferably from 1:5 to 5:1, particularly preferably from 1:2 to 2:1.

3. Process according to embodiment 1 or 2, characterized in that the Brønsted acid is carboxylic acids such as for example trifluoroacetic acid, sulfonic acids such as for example methanesulfonic acid, p-toluenesulfonic acid and dodecylbenzenesulfonic acid, mineral acids such as for example hydrochloric acid, nitric acid, sulfuric acid and phosphoric acid.

4. Process according to any of the preceding embodiments, characterized in that the silanes are dimethyldialkoxysilanes selected from diethoxydimethylsilane and dimethoxydimethylsilane, methyltrialkoxysilanes selected from triethoxymethylsilane and trimethoxymethylsilane, and tetraalkoxysilanes selected from tetraethoxysilane and tetramethoxysilane.

5. Process according to any of the preceding embodiments, characterized in that the cyclic polyorganosiloxanes selected from $D_3$ (hexamethylcyclotrisiloxane), $D_4$ (octamethylcyclotetrasiloxane), $D_5$ (decamethylcyclopentasiloxane) and/or $D_6$ (dodecamethylcyclohexasiloxane), where $D_4$ and/or $D_5$ are particularly preferred, and $D_5$ is most preferred, are used.

6. Process according to any of the preceding embodiments, characterized in that the cyclic polyorganosiloxanes are cyclic branched polyorganosiloxanes of the DT type, preferably
    i) mixtures of cyclic branched siloxanes of the D/T type which consist of siloxanes having D and T units and whose cumulative proportion of D and T units present in the siloxane matrix and having Si-alkoxy and/or SiOH groups, determinable by $^{29}$Si NMR spectroscopy, is ≤2 mole percent, preferably less than 1 mole percent, and which preferably contain at least 5 percent by weight of siloxane cycles, such as preferably octamethylcyclotetrasiloxane ($D_4$), decamethylcyclopentasiloxane ($D_5$) and/or mixtures of these or else ii) mixtures of cyclic branched siloxanes having D and T units whose cumulative proportion of D and T units present in the siloxane matrix and having Si-alkoxy and/or SiOH groups, determinable by $^{29}$Si NMR spectroscopy, is greater than 2 and less than 10 mole percent.

7. Process according to any of the preceding embodiments, wherein the heating takes place at a temperature of 40° C. to 180° C., particularly preferably of 80° C. to 150° C., for a time which suffices for the formation of the non-cyclic alkoxy-functional siloxane.

8. Process according to any of the preceding embodiments, wherein the constituents (A) and (B) are used in amounts such that the molar ratio of (A)/(B) is at least 1:1, preferably at least 2:1.

9. Process according to any of the preceding embodiments, wherein the constituent (C) is present in an amount of 0.1 mol % to 5 mol %, preferably 0.2 mol % to 1 mol % and particularly preferably 0.5 mol % to 1 mol %, based on the combined weights of the constituents (A), (B) and (C).

10. Process according to any of the preceding embodiments, wherein the addition of water is not required.

11. Use of non-cyclic alkoxy-functional siloxanes, produced by a process as defined in any of embodiments 1 to 10, for the production of polyethersiloxanes, especially for the production of polyurethane foam stabilizers, defoamers, paint additives, levelling additives and dispersing additives and/or demulsifiers.

BRIEF DESCRIPTION OF DRAWING

The FIGURE shows a $^{29}$Si NMR spectrum. The signal at −13 ppm can be assigned to the ethoxy groups. The polysiloxane chain is recognised at −22 ppm.

DETAILED DESCRIPTION OF THE INVENTION

In this connection, it has been found in accordance with the invention, and completely surprisingly, that a process for producing a reaction product containing a non-cyclic alkoxy-functional polysiloxane by means of heating a reaction system comprising:
    (A) a cyclic polyorganosiloxane of the formula $[(R^1_2SiO)_{2/2}]_n$, where the subscript n is an integer of at least 4 and each $R^1$ is an alkyl group or aryl group;
    (B) a silane of the formula $R^2_{(4-m)Si(OR^3)_m}$, where the subscript m is an integer from 1 to 4, each $R^2$ independently is an alkyl group or aryl group, a hydrocarbyl group or a halogenated hydrocarbyl group and each $R^3$ independently is an alkyl group; and
    (C) a catalyst system comprising a metal trifluoromethanesulfonate of the formula $[M]^+[CF_3SO_3]^-$, where M is a metal atom selected from sodium (Na) and potassium (K), and a Brønsted acid,
wherein Brønsted acids having a pKa≤3.0, preferably having a pKa≤2.0, particularly preferably having a pKa≤−0.0 are used,
achieves the object in an outstanding manner.

It was completely surprising that the acid-catalysed ring opening of the cyclic polyorganosiloxane by means of the inventive catalyst system comprising a metal trifluoromethanesulfonate of the formula $[M]^+[CF_3SO_3]^-$, where M is a metal atom selected from sodium (Na) and potassium (K), and a Brønsted acid was made possible at all.

Trifluoromethanesulfonate salts, metal trifluoromethanesulfonates, triflates, metal triflates are understood here to be synonyms.

The molar ratio of Brønsted acid used to metal trifluoromethanesulfonate is preferably in the range from 1:10 to 10:1, preferably from 1:5 to 5:1, particularly preferably from 1:2 to 2:1.

Preferred co-catalysts are Brønsted acids. Examples of suitable Brønsted acids are carboxylic acids such as for example trifluoroacetic acid, sulfonic acids such as for example methanesulfonic acid, p-toluenesulfonic acid and dodecylbenzenesulfonic acid, mineral acids such as for example hydrochloric acid, nitric acid, sulfuric acid and phosphoric acid.

The Brønsted acid that is particularly preferably to be used according to the invention is a methanesulfonic acid, sulfuric acid, phosphoric acid, trifluoroacetic acid and p-toluenesulfonic acid.

The inventors have found that an acid-catalysed ring opening of the cyclic polyorganosiloxane using only Na triflates or K triflates or only methanesulfonic acid does not succeed, however a mixture of Na triflates or K triflates and methanesulfonic acids does. The advantage is thus that corrosive catalysts such as Al triflates or iron triflates can be dispensed with. Furthermore, the use of heavy metal-containing catalysts such as gallium triflates, scandium triflates, chromium triflates is a further advantageous aspect of the invention.

The silanes are preferably dimethyldialkoxysilanes (such as e.g. diethoxydimethylsilane and dimethoxydimethylsilane), methyltrialkoxysilanes (such as e.g. triethoxymethylsilane and trimethoxymethylsilane), and tetraalkoxysilanes (tetraethoxysilane and tetramethoxysilane).

If within the context of the invention cyclic polyorganosiloxanes are used, in particular encompassing $D_3$ (hexamethylcyclotrisiloxane), (octamethylcyclotetrasiloxane), $D_5$ (decamethylcyclopentasiloxane) and/or $D_6$ (dodecamethylcyclohexasiloxane), where $D_4$ and/or $D_5$ are particularly preferred, and $D_5$ is most preferred, this is a further preferred embodiment of the invention.

If within the context of the invention cyclic polyorganosiloxanes, in particular cyclic branched siloxanes of the DT type are used, these are preferably
i. mixtures of cyclic branched siloxanes of the D/T type which (preferably exclusively) consist of siloxanes having D and T units and whose cumulative proportion of D and T units present in the siloxane matrix and having Si-alkoxy and/or SiOH groups, determinable by $^{29}$Si NMR spectroscopy, is ≤2 mole percent, preferably less than 1 mole percent, and which preferably contain at least 5 percent by weight of siloxane cycles, such as preferably octamethylcyclotetrasiloxane ($D_4$), decamethylcyclopentasiloxane ($D_5$) and/or mixtures of these or else
ii. mixtures of cyclic branched siloxanes having (preferably exclusively) D and T units whose cumulative proportion of D and T units present in the siloxane matrix and having Si-alkoxy and/or SiOH groups, determinable by $^{29}$Si NMR spectroscopy, is greater than 2 and less than 10 mole percent, this is a further preferred embodiment of the invention.

According to a preferred embodiment of the invention, the heating takes place at a temperature of 40° C. to 180° C., particularly preferably of 80° C. to 150° C., for a time which suffices for the formation of the non-cyclic alkoxy-functional siloxane.

The constituents (A) and (B) are preferably used in amounts such that the molar ratio of (A)/(B) is at least 1:1, preferably at least 2:1.

The process according to the invention is characterized in that the constituent (C) is present preferably in an amount of 0.1 mol % to 5 mol %, preferably 0.2 mol % to 1 mol % and particularly preferably 0.5 mol % to 1 mol %. based on the combined weights of the constituents (A), (B) and (C).

In terms of process engineering and economics, it is not preferable to add greater amounts of metal trffluoromethanesuffonates and Brønsted acids in the inventive reaction system, since these may also have to be removed again at the latest during the further processing of the alkoxy-functional siloxane obtained.

In another preferred embodiment, no addition of water is required.

The invention further provides for the use of alkoxy-functional siloxanes, produced using a reaction system, as described above, for the production of polyethersiloxanes, especially for the production of polyurethane foam stabilizers, defoamers, especially diesel defoamers, deaerating agents, wetting agents, paint additives, levelling additives and dispersing additives and/or demulsifiers, hydrophobizing agents.

It is also conceivable to use polyethersiloxanes produced in this manner, as described above, for the production of polymer dispersions; for the production of adhesives or sealants; for the surface treatment of fibres, particles or fabrics, especially for the finishing or impregnation of textiles, for the production of paper towels, in the coating of fillers; for the production of cleaning and care formulations for the household or for industrial purposes, especially for the production of fabric softeners; for the production of cosmetic, pharmaceutical and dermatological compositions, especially cosmetic cleansing and care formulations, hair treatment agents and hair after treatment agents; for the cleaning and care of hard surfaces; as a processing aid in the extrusion of thermoplastics; for the production of thermoplastic shaped bodies; as adjuvant in crop protection; for the production of construction material compositions.

EXAMPLES

The following examples serve only to explain this invention for those skilled in the art and do not constitute any restriction whatsoever of the claimed subject matter. Determination of the water contents is performed in principle by the Karl Fischer method based on DIN 51777, DGF E-III 10 and DGF C-III 13a. $^{29}$Si NMR spectroscopy was used for reaction monitoring in all examples.

In the context of this invention, the $^{29}$Si NMR samples are analysed at a measurement frequency of 79.49 MHz in a Bruker Avance III spectrometer equipped with a 287430 probe head with gap width of 10 mm, dissolved at 22° C. in CDCl3 and measured against a tetramethylsilane (TMS) external standard [δ($^{29}$Si)=0.0 ppm].

GPCs (gel permeation chromatography) are recorded using THF as the mobile phase on an SDV 1000/10000A column combination having a length of 65 cm, ID 0.80, at a temperature of 30° C. using a SECcurity² GPC System 1260 (PSS Polymer Standards Service GmbH).

The gas chromatograms are recorded on a GC instrument of the GC 7890B type from Agilent Technologies, equipped with a column of the HP-1 type; 30 m×0.32 mm ID×0.25 μm dF (Agilent Technologies no. 19091Z-413E) and hydrogen as carrier gas, with the following parameters:

Detector: FID; 310° C.
Injector: split; 290° C.
Mode: constant flow, 2 ml/min
Temperature programme: 60° C. at 8° C./min-150° C. at 40° C./min-300° C. 10 min.

Unless stated otherwise, all figures are to be understood to be weight percentages.

I. Process According to the Invention for Producing a Non-Cyclic Alkoxy-Functional Polysiloxane

Example 1A

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 72.8 g (0.5 mol) of diethoxydimethylsilane (Dynasylan 9811, Evonik) while stirring at 23° C. In a second step, 0.8 g of potassium triflates and 0.8 g of methanesulfonic acid were added sequentially to the reaction mixture. The mixture was subsequently heated to 140° C. and held at reaction temperature for 6 hours. After the reaction time, the reaction mixture was cooled down to 23° C. Cooling of the reaction mixture afforded a clear orange α-ω diethoxypolysiloxane. A clear terminal α-ω diethoxypolysiloxane is therefore obtained, the target structure of which is confirmed by the accompanying $^{29}$Si NMR spectroscopy. The $^{29}$Si NMR spectroscopy likewise assures that no contents whatsoever of SiOH groups are present, within the scope of measurement accuracy.

Example 1B

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 72.8 g (0.5 mol) of diethoxydimethylsilane (Dynasylan 9811, Evonik) while stirring at 23° C. In a second step, 0.8 g of potassium triflates, 0.8 g of methanesulfonic acid, and 0.2 g of water were added sequentially to the reaction mixture. The mixture was subsequently heated to 140° C. and held at reaction temperature for 6 hours. After the reaction time, the reaction mixture was cooled down to 23° C. Cooling of the reaction mixture afforded a clear yellow α-ω diethoxypolysiloxane.

A clear terminal α-ω diethoxypolysiloxane is therefore obtained, the target structure of which is confirmed by the accompanying $^{29}$Si NMR spectroscopy. The $^{29}$Si NMR spectroscopy likewise assures that no contents whatsoever of SiOH groups are present, within the scope of measurement accuracy.

Example 1C

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 718 g (0.5 mol) of diethoxydimethylsilane (Dynasylan 9811, Evonik) while stirring at 23° C. In a second step, 0.8 g of sodium triflates and 0.8 g of methanesulfonic acid were added sequentially to the reaction mixture. The mixture was subsequently heated to 140° C. and held at reaction temperature for 6 hours. After the reaction time, the reaction mixture was cooled down to 23° C. Cooling of the reaction mixture afforded a clear colourless α-ω diethoxypolysiloxane. A clear terminal α-ω diethoxypolysiloxane is therefore obtained, the target structure of which is confirmed by the accompanying $^{29}$Si NMR spectroscopy. The $^{29}$Si NMR spectroscopy likewise assures that no contents whatsoever of SiOH groups are present, within the scope of measurement accuracy. (FIGURE)

FIGURE: In the $^{29}$Si NMR spectrum, the signal at −13 ppm can be assigned to the ethoxy groups. The polysiloxane chain is recognised at −22 ppm.

Example 1.D

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 72.8 g (0.5 mol) of diethoxydimethylsilane (Dynasylan 9811, Evonik) while stirring at 23° C. In a second step, 0.8 g of sodium triflates, 0.8 g of methanesulfonic acid, and 0.2 g of water were added sequentially to the reaction mixture. The mixture was subsequently heated to 140° C. and held at reaction temperature for 6 hours. After the reaction time, the reaction mixture was cooled down to 23° C. Cooling of the reaction mixture afforded a clear yellow α-ω diethoxypolysiloxane.

A clear terminal α-ω diethoxypolysiloxane is therefore obtained, the target structure of which is confirmed by the accompanying $^{29}$Si NMR spectroscopy. The $^{29}$Si NMR spectroscopy likewise assures that no contents whatsoever of SiOH groups are present, within the scope of measurement accuracy.

II. Process for Producing a Non-Cyclic Alkoxy-Functional Siloxane Using Na Triflates or K Triflates

Example 2A

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 718 g (0.5 mol) of diethoxydimethylsilane (Dynasylan 9811, Evonik) while stirring at 23° C. In a second step, 0.8 g of potassium triflate was added to the reaction mixture. The mixture was subsequently heated to 140° C. and held at reaction temperature for 6 hours. After the reaction time, the reaction mixture was cooled down to 23° C. Cooling of the reaction mixture afforded a clear yellow mixture of D4/D5 and diethoxydimethylsilane.

A terminal α-ω diethoxypolysiloxane is not obtained, evidence of which is provided by the accompanying $^{29}$Si NMR spectroscopy.

Example 2B

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 72.8 g (0.5 mol) of diethoxydimethylsilane Dynasylan 9811, Evonik) while stirring at 23° C. In a second step, 0.8 g of sodium triflate was added to the reaction mixture. The mixture was subsequently heated to 140° C. and held at reaction temperature for 6 hours. After the reaction time, the reaction mixture was cooled down to 23° C. Cooling of the reaction mixture afforded a clear yellow mixture of D4/D5 and diethoxydimethylsilane.

A terminal α-ω diethoxypolysiloxane is not obtained, evidence of which is provided by the accompanying $^{29}$Si NMR spectroscopy.

III. Process for Producing a Non-Cyclic Alkoxy-Functional Siloxane Using MSA

Example 3A

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 72.8 g (0.5 mol) of diethoxydimethylsilane (Dynasylan 9811, Evonik) while stirring at 23° C. In a second step, 0.8 g of methanesulfonic acid was added to the reaction mixture. The mixture was subsequently heated to 140° C. and held at reaction temperature for 6 hours. After the reaction time, the reaction mixture was cooled down to 23° C. Cooling of the reaction mixture afforded a clear yellow mixture of D4/D5 and diethoxydimethylsilane.

A terminal α-ω diethoxypolysiloxane is not obtained, evidence of which is provided by the accompanying $^{29}$Si NMR spectroscopy.

Example 3B

A 500 ml four-neck round-bottom flask equipped with a precision glass stirrer, an internal thermometer, and a reflux condenser on top was initially charged with 327.2 g (4.4 mol of D units) of a D4/D5 cycle mixture available from Dow with 72.8 g (0.5 mol) of diethoxydimethylsilane (Dynasylan 9811, Evonik) while stirring at 23° C. In a second step, 0.8 g of methanesulfonic acid, and 0.2 g of water were added sequentially to the reaction mixture. The mixture was subsequently heated to 140° C. and held at reaction temperature for 6 hours, After the reaction time, the reaction mixture was cooled down to 23° C. Cooling of the reaction mixture afforded a clear yellow mixture of D4/D5 and diethoxydimethylsilane. A terminal α-ω diethoxypolysiloxane is not obtained, evidence of which is provided by the accompanying $^{29}$Si NMR spectroscopy.

The invention claimed is:

1. A process for producing a reaction product comprising a non-cyclic alkoxy-functional polysiloxane, the process comprising:
heating a reaction system comprising:
(A) a cyclic polyorganosiloxane of formul a [(R$^1_2$SiO)$_{2/2}$]$_n$, wherein n is an integer of at least 4 and each R$^1$ is an alkyl group or aryl group;
(B) a silane of formula R$^2_{(4-m)}$Si(OR$^3$)$_m$, wherein m is an integer from 1 to 4, each R$^2$ independently is selected from the group consisting of an alkyl group, aryl group, a hydrocarhyl group, and a halogenated hydrocarbyl group, and each R$^3$ independently is an alkyl group; and
(C) a catalyst system comprising:
a metal trifluoromethanesulfonate of formula [M]$^+$ [CF$_3$SO$_3$]$^-$, wherein M is a metal atom selected from sodium (Na) and potassium (K), and
a Brønsted acid,
wherein the Brønsted acid has a pKa≤3.0.

2. The process according to claim 1, wherein a molar ratio of the Brønsted acid to the metal trifluoromethanesulfonate is in a range from 1:10 to 10:1.

3. The process according to claim 1, wherein the Brønsted acid is selected from the group consisting of carboxylic acids, sulfonic acids, and mineral acids.

4. The process according to claim 1, wherein the silane is selected from the group consisting of
a ditnethyldialkoxysilane selected from the group consisting of diethoxydimethylsilane and dimethoxydimethylsilane,
a methyltrialkoxysilane selected from the group consisting of triethoxymethylsilane, and trimethoxymethylsilane, and
a tetraalkoxysilane selected from the group consisting of tetraethoxysilane and tetramethoxysilane.

5. The process according to claim 1, wherein the cyclic polyorganosiloxane is selected from the group consisting of octamethylcyclotetrasiloxane (D$_4$), decamethylcyclopentasiloxane (D$_5$), dodecamethylcyclohexasiloxane (D$_6$), and a mixture thereof.

6. The process according to claim 1, wherein the cyclic polyorganosiloxane is a cyclic branched polyorganosiloxane of D/T type which is,
i) mixtures of cyclic branched siloxanes of the D/T type which comprises siloxanes having D and T units and whose cumulative proportion of D and T units present in a siloxane matrix and having Si-alkoxy and/or SiOH groups, determinable by $^{29}$Si NMR spectroscopy, is ≤2 mole per cent, or
ii) mixtures of cyclic branched siloxanes having D and T units whose cumulative proportion of D and T units present in a siloxane matrix and having Si-alkoxy and/or SiOH groups, determinable by $^{29}$Si NMR spectroscopy, is greater than 2 and less than 10 mole per cent.

7. The process according to claim 1, wherein the heating takes place at a temperature of 40° C. to 180° C., for a time which suffices for the formation of the non-cyclic alkoxy-functional siloxane.

8. The process according to claim 1, wherein (A) and (B) are used in amounts such that a molar ratio of (A)/(B) is at least 1:1.

9. The process according to claim 1, wherein (C) is present in an amount of 0.1 to 5 wt. %, based on combined weights of the (A), (B), and (C).

10. The process according to claim 1, wherein water is not added to the reaction system.

11. The process according to claim 1, wherein the Bronsted acid has a pKa≤0.0.

12. The process according to claim 2, wherein the molar ratio of the Bronsted acid to the metal trifluoromethanesulfonate is in a range from 1:2 to 2:1.

13. The process according to claim 3, wherein the Bronsted acid is selected from the group consisting of trifluoroacetic acid, methanesulfonic acid, p-toluenesulfonic acid, dodecylbenzenesuffonic acid, hydrochloric acid, nitric acid, sulfuric acid, and phosphoric acid.

14. The process according to claim 5, wherein the cyclic polyorganosiloxane is D$_5$.

15. The process according to claim 6, wherein, for the mixture of i), the cumulative proportion of D and T units is less than 1 mole per cent, and wherein the mixture of i) comprises at east 5 per cent by weight of a siloxane cycle selected from the group consisting of D$_4$, D$_5$, and a mixture thereof.

16. The process according to claim 8, wherein the molar ratio of (A)/(B) is at least 2:1.

17. The process according to claim 9, wherein (C) is present in an amount of 0.5 to 1 wt. %, based on the combined weights of (A), (B), and (C).

* * * * *